United States Patent [19]

Whyman

[11] Patent Number: 4,913,280
[45] Date of Patent: Apr. 3, 1990

[54] AUGER FOR PARTICULATE MATERIALS

[75] Inventor: Andrew D. Whyman, Oakville, Canada

[73] Assignee: Du Pont Canada Inc., Mississauga, Canada

[21] Appl. No.: 286,783

[22] Filed: Dec. 20, 1988

[51] Int. Cl.$^4$ .............................................. B65G 33/26
[52] U.S. Cl. .................................... 198/659; 198/677; 198/666
[58] Field of Search ............... 198/659, 676, 677, 662, 198/666, 671, 661

[56] References Cited

U.S. PATENT DOCUMENTS

| | | | |
|---|---|---|---|
| 915,702 | 3/1909 | Schroer | 198/676 |
| 2,888,128 | 5/1959 | Allen | 198/659 X |
| 3,280,963 | 10/1966 | Kirker, Jr. | 198/677 |
| 3,360,108 | 12/1967 | Voss | 198/659 |
| 3,485,116 | 12/1969 | Fender | 76/2 |
| 4,666,033 | 5/1987 | Reid | 198/664 |
| 4,746,384 | 5/1988 | Tan | 198/677 X |

FOREIGN PATENT DOCUMENTS

| | | | |
|---|---|---|---|
| 2355414 | 5/1974 | Fed. Rep. of Germany | 198/659 |
| 1348102 | 11/1963 | France | 198/661 |
| 1315369 | 6/1987 | U.S.S.R. | 198/659 |
| 591891 | 9/1941 | United Kingdom | 198/666 |

Primary Examiner—Robert J. Spar
Assistant Examiner—Cheryl L. Gastineau

[57] ABSTRACT

An auger assembly for transporting particulate material. The auger assembly comprises a housing, a frame to support the housing, and an auger rotatably mounted in said housing. The auger comprises a thermoplastic material helically wrapped around a metal shaft. The material has a planar portion in contact with said metal shaft and a radially extending flight portion. A motor is connected to the shaft to rotate the auger.

12 Claims, 5 Drawing Sheets

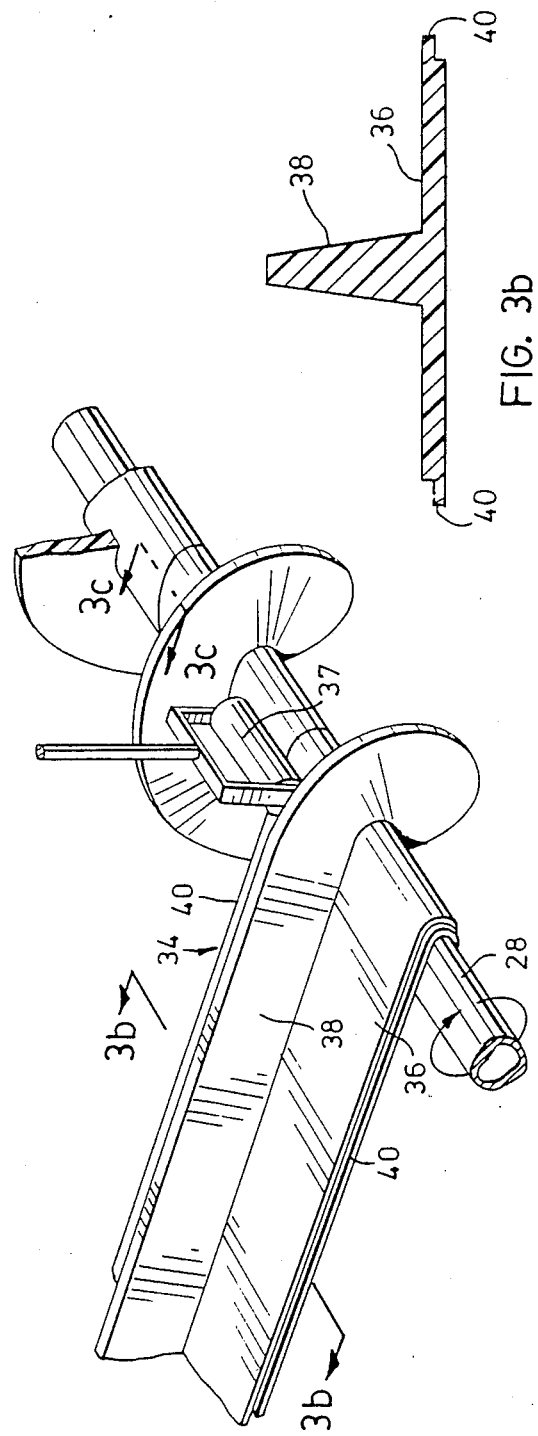
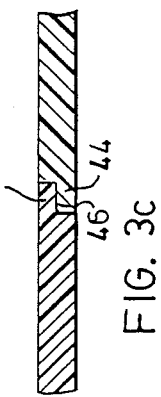
FIG. 3b
FIG. 3c
FIG. 3a

AUGER FOR PARTICULATE MATERIALS

BACKGROUND OF THE INVENTION

This invention relates to augers and more particularly to augers for transporting particulate materials.

Conventional augers are used for a wide range of applications from moving fertilizer and transferring grain to and from silos, to handling coal. These augers are generally made of metal and are housed in a metal barrel which is supported on a frame. Normally agricultural augers have a useful life of about ten years before corrosion and mechanical damage reduce them to scrap. They are extremely noisy and may plug up during use.

It is an object of the present invention to obviate or mitigate the above disadvantages.

SUMMARY OF THE INVENTION

Accordingly, the invention provides an auger assembley for transporting particulate material, said auger assembly comprising:
 a housing;
 a frame to support said housing;
 an auger rotatably mounted in said housing, said auger comprising an elongated thermoplastic material helically wrapped around a metal shaft, said material having a planar portion in contact with said metal shaft and a radially extending helical flight portion; and
 a motor connected to said shaft to rotate said auger.

In another one of its aspects the invention provides an auger for transporting particulate material, said auger comprising thermoplastic material helically wrapped around a metal shaft, said material having a planar portion in contact with said metal shaft and a radially extending helical flight portion.

In still another one of its aspects, the invention provides a process for manufacturing an auger comprising the steps of:
 heating a metal shaft;
 helically winding an elongated piece of at least partially molten thermoplastic material having a planar portion and a projecting portion around said shaft such that said planar portion is in contact with said shaft and said projecting portion extends radially from said shaft; and
 and allowing said shaft and thermoplastic material to cool.

The auger of the present invention is provided with at least one thermoplastic flight. The auger is therefore less susceptible to corrosion and mechanical wear and is less noisy than conventional metal augers.

DESCRIPTION OF THE PREFERRED EMBODIMENTS

Figure 1:
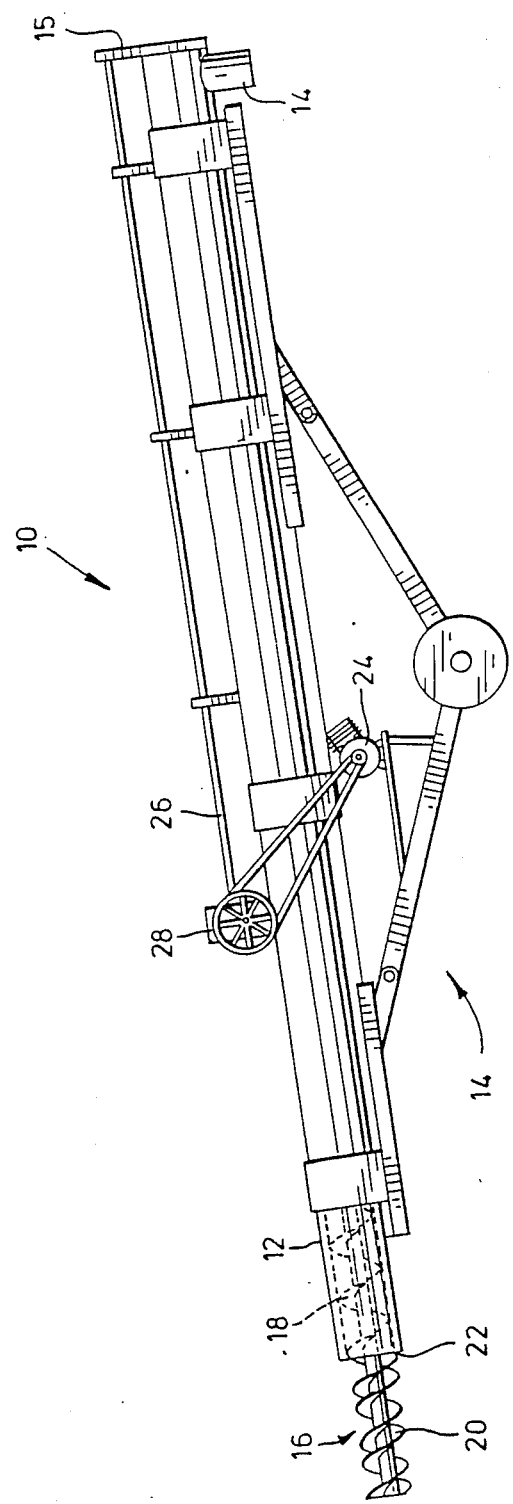
Figure 2B:
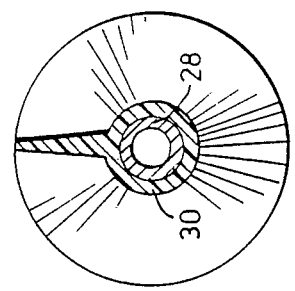
Figure 2A:
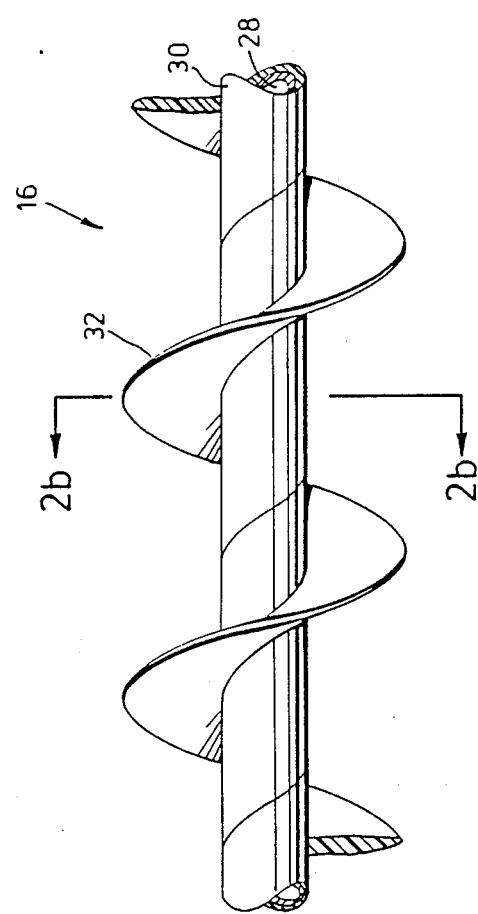
Figures 4A, 4B:
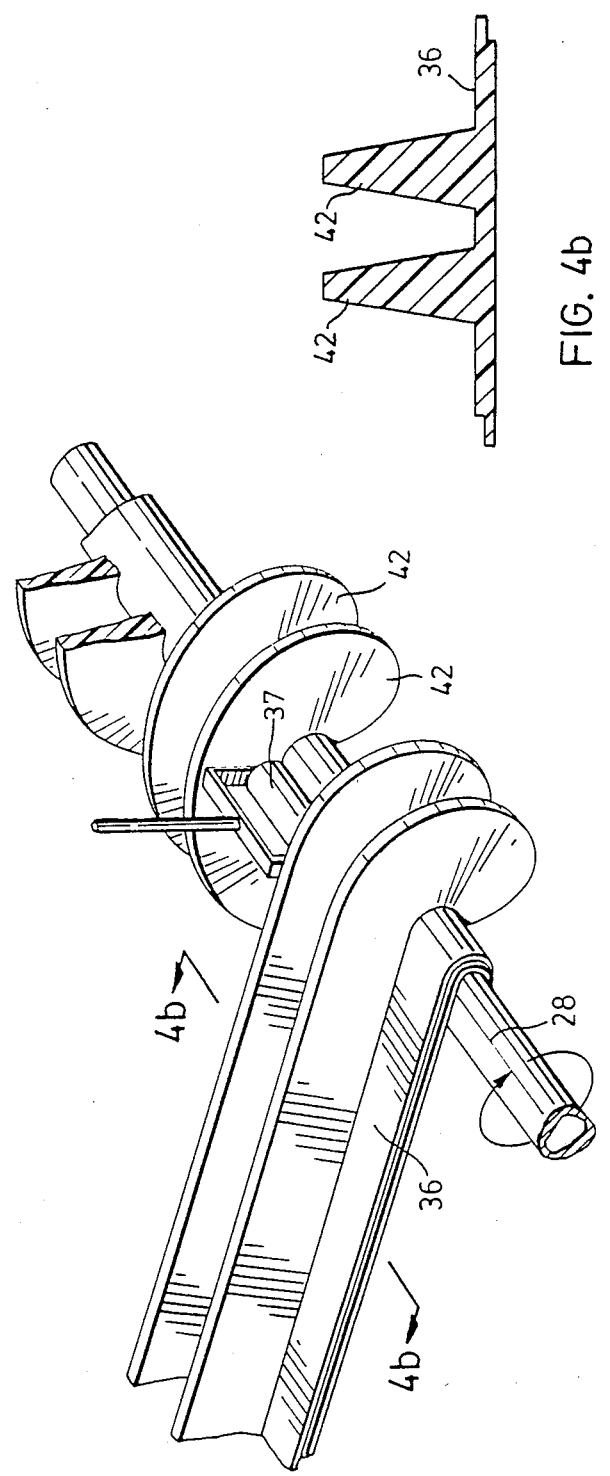
Figure 5:
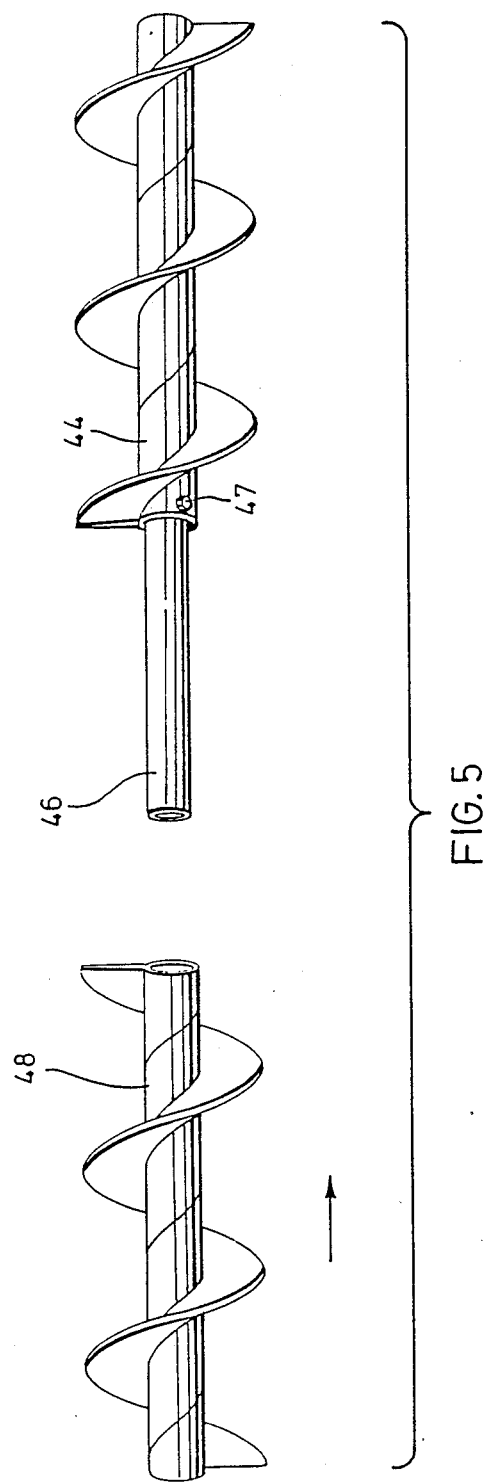

The invention will be further described, by way of illustration only, with reference to the following drawings in which:
 FIG. 1 is side view of an auger assembley;
 FIG. 2A is a side view of a single-flighted auger;
 FIG. 2B is a cross-sectional view along line 2B—2B of FIG. 2A;
 FIG. 3A is a perspective view of a single-flighted auger being manufactured;
 FIG. 3B is a cross-sectional view along line 3B—3B of FIG. 3A;
 FIG. 3C is a cross-sectional view along line 3C—3C of FIG. 3A;
 FIG. 4A is a perspective view of a double-flighted auger being manufactured;
 FIG. 4B is a cross-sectional view along line 4B—4B of FIG. 4A; and
 FIG. 5 is a side view of an alternative embodiment of the invention.

Referring to FIG. 1, a typical agricultural auger assembley 10 includes a barrel 12 having a spout 14 at one end 15. The barrel 12 is supported on a portable frame 14 and houses an auger 16. The auger has a single flighted portion 18 (shown in dotted outline) which extends along the entire length of the barrel and a double flighted portion 20 which extends beyond the other end 22 of the barrel 12. A motor 24 is mounted on the frame 14 and is connected via a belt drive to a drive shaft 26 via a gear box 28. The drive shaft 26 is connected to the auger 16 to rotate the auger.

In operation, the double flighted portion 20 of the auger is inserted in the particulate material to be transported and the auger is rotated. Particulate material travels along the length of the barrel 12 and exits through the spout 14.

Details of the single flighted portion of the auger may best be seen in FIGS. 2A and 2B. The auger 16 has a metal shaft 28 surrounded by a layer 30 of polyethylene. Integral with this polyethylene layer 30 and extending radially therefrom is a helical polyethylene screw flight 32.

The method of manufacturing this auger 16 is illustrated in FIGS. 3A and 3B. The metal shaft 28 is first heated to a temperature close to the melting point of the thermoplastic and, as may be seen in these figures, an elongated piece of at least partially molten material 34 having a planar portion 36 and a central projection 38, is wrapped helically around the metal shaft 28. The material is wrapped around the shaft with the planar portion 36 in contact with the shaft 28 and the projection 38 extending radially from the shaft to form the screw flight 32. The wrapping is done sufficiently tightly that opposing longitudinal edges 40 of the planar portion 36 are overlapping so that the metal shaft 28 is completely covered by polyethylene to protect it from corrosion. As may be seen in FIG. 3C, one of the opposing edges has an overlapping portion 42 and the other of the opposing edges has an underlapping portion 44. The heat of the shaft promotes the fusing together of the edges at the interface 46. Pressure may be applied by a roller 37 to the overlapping opposing edges to assist in fusing these edges together.

FIGS. 4A and 4B illustrate the manufacture a double-flighted screw portion. In this embodiment, the elongated material has two projections 42.

The planar portion 36 of the at least partially molten polyethylene may be fused onto the shaft using polymer/metal compatibilizers or adhesives or may be made so that it is removable from the shaft. FIG. 5 depicts the latter alternative. The thermoplastic portion of the auger may be made in sections 44 which may be fastened to a metal shaft 46 by mechanical fasteners such as bolts, screws or rivets. Sections may be removed and replaced with replacement sections 48.

The shaft 28 may be made of any heat conductive metal, although steel is preferred. The layer 30 and screw flight 32 are preferably made of polyethylene, although any of the following thermoplastic materials:

nylon, polypropylene, polyvinylchloride, and polyester (polyethylene terephthalate), may be used instead.

I claim:

1. An auger assembly for transporting particulate material, said auger assembly comprising:
   a housing;
   a frame to support said housing;
   an auger rotatably mounted in said housing, said auger comprising a thermoplastic material helically wrapped around a metal shaft, said thermoplastic material having a planar portion in contact with said metal shaft and a radially extending flight portion, wherein opposing longitudinal edges of said thermoplastic material overlap and are fused together; and
   a motor connected to said shaft to rotate said auger.

2. The auger assembly of claim 1 wherein said auger has a double flighted portion at one end which extends beyond said housing and a single flighted portion which extends along the length of said housing.

3. The auger assembly of claim 2 wherein said single flighted portion has a single radially extending flight portion and said double flighted portion has a pair of radially extending flight portions.

4. The auger assembly of claim 1 wherein said planar portion is fused onto said shaft.

5. The auger assembly of claim 1 wherein said planar portion is removably fastened to said shaft.

6. The auger assembly of claim 5 wherein said material is in individually removable or insertable longitudinal sections.

7. An auger for transporting particulate material, said auger comprising a thermoplastic material helically wrapped around a metal shaft, said thermoplastic material having a planar portion in contact with said metal shaft and a radially extending helical flight portion, wherein opposing edges of said thermoplastic material overlap and are fused together.

8. The auger of claim 7 wherein said auger comprises a double flighted portion having a pair of radially extending helical flight portions and a single flighted portion having a single radially extending flight portion.

9. The auger of claim 7 wherein said planar portion is fused onto said shaft.

10. The auger of claim 7 wherein said planar portion is removably fastened to said shaft.

11. The auger of claim 10 wherein said material is in individually removable longitudinal sections.

12. An auger for transporting particulate material, said auger comprising a thermoplastic material helically wrapped around a metal shaft, said thermoplastic material having a planar portion in contact with said metal shaft and a radially extending helical flight portion, wherein opposing edges of said thermoplastic material overlap and are fused together, wherein one of said opposing edges has an overlapping portion and the other of said opposing edges has an underlapping portion and wherein the edges are fused together at the interface between the underlapping portion and the overlapping portion.

* * * * *